(12) United States Patent
Kawai et al.

(10) Patent No.: US 6,437,689 B2
(45) Date of Patent: Aug. 20, 2002

(54) AGENT APPARATUS

(75) Inventors: Makoto Kawai; Kazuya Tamura, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/814,169

(22) Filed: Mar. 22, 2001

(30) Foreign Application Priority Data

Mar. 23, 2000 (JP) ........................................ 2000-082922

(51) Int. Cl.[7] ............................................... B60Q 1/00
(52) U.S. Cl. ...................... 340/439; 340/426; 307/10.2
(58) Field of Search ............................... 340/439, 426, 340/5.51, 5.81, 5.8, 576; 180/257, 272, 286; 307/10.2; 200/200, 201

(56) References Cited

U.S. PATENT DOCUMENTS

| | | | | |
|---|---|---|---|---|
| 4,677,429 A | * | 6/1987 | Glotzbach | 340/521 |
| 4,856,072 A | * | 8/1989 | Schneider | 340/825.31 |
| 5,631,638 A | * | 5/1997 | Kaspar | 340/902 |
| 5,694,116 A | * | 12/1997 | Kojima | 340/576 |
| 6,127,947 A | * | 10/2000 | Uchida | 340/999 |
| 6,202,008 B1 | * | 3/2001 | Beckert | 340/825.14 |
| 6,304,817 B1 | * | 10/2001 | Troedel | 340/996 |

FOREIGN PATENT DOCUMENTS

JP             11-250395          9/1999

* cited by examiner

*Primary Examiner*—Anh La
(74) *Attorney, Agent, or Firm*—Arent Fox Kintner Plotkin & Kahn, PLLC

(57) ABSTRACT

An agent apparatus increases security, and can make responses suited to individuals, thereby increasing convenience. The agent apparatus comprises an individual recognition unit which recognizes individuals who use a vehicle; a memory unit which stores agent data corresponding to each individual recognized by the individual recognition unit; a selection unit which selects agent data corresponding to a specific individuals recognized by the individual recognition unit from the agent data stored in the memory unit; and a response unit which responds to the individual based on the agent data selected by the selection unit.

9 Claims, 7 Drawing Sheets

AGENT APPARATUS

BACKGROUND OF THE INVENTION

1. Field of the Invention

The present invention relates to an agent apparatus which supplies a plurality of information in an easily-understandable format to a driver of a vehicle, and assists the driver by setting the status of the vehicle in accordance with his commands to a status which is suitable for him.

2. Description of the Related Art

A conventional agent apparatus is provided in a vehicle, and displays information relating to conditions of the vehicle, such as its position and status, and warnings, route guides, and the like corresponding to the conditions, on a display as human expressions and movements. Since the agent apparatus displays the information visually, it has an advantage that the driver can easily understand the information.

However, the conventional agent apparatus has security problems, since it does not recognize individuals. Although persons who ride in the vehicle have individual preferences, the agent apparatus always responds in the same manner, and cannot respond so as to suit individual preferences.

BRIEF SUMMARY OF THE INVENTION

The present invention has been achieved in order to solve the above problems. It is an object of this invention to provide an agent apparatus which has increased security and can respond to suit individuals, thereby increasing convenience.

The agent apparatus according to a first aspect of this invention comprises an individual recognition unit (individual recognition section 16 in the embodiment) which recognizes individuals who use a vehicle; a memory unit (memory apparatus 8 in the embodiment) which stores agent data (agent A for individual 33 and agent B for individual 34 in the embodiment) corresponding to each individual recognized by the individual recognition unit; a selection unit (agent selection section for individual 20 in the embodiment) which selects agent data corresponding to a specific individual recognized by the individual recognition unit from the agent data stored in the memory unit; and a response unit (voice control section 14, display control section 15, and communication control section 23 in the embodiment) which responds to the individual based on the agent data selected by the selection unit.

According to the above constitution, security is increased since the individual recognition unit recognizes the individual. The individual recognition unit recognizes the individual, and the selection unit selects agent data corresponding to the individual from the agent data stored in the memory unit. Based on the result of the selection, the response unit makes a response which is suited to the individual, thereby increasing convenience.

The individual recognition unit may comprise a number recognition unit which recognizes a secret code number of the individual, a voice recognition unit which recognizes the voice of the individual, an image recognition unit which recognizes the image of the individual, and the like.

According to a second aspect of the invention, the agent apparatus of the first aspect further comprises an input unit (input control section 13 and voice control section 14 in the embodiment) which inputs commands from individuals who use a vehicle; a command execution unit (on-board device monitor/control section 17 in the embodiment) which executes commands input from the input unit; and a learning unit (agent learning section 21 in the embodiment) which changes the content of the agent data stored in the memory unit in accordance with commands input from the input unit.

According to the above constitution, the learning unit changes the content of the agent data stored in the memory unit in accordance with commands input from the input unit. Therefore, the agent apparatus can learn the preferences and the like of the individuals who use the vehicle, and functions better the more it is used by each individual. This further increases convenience.

According to a third aspect of the invention, the agent apparatus of the first and second aspects further comprises an on-board communication unit (on-board telephone in the embodiment) which transmits a response from the response unit to a portable communication unit (mobile telephone 11 in the embodiment) carried by an individual who will use the vehicle, and receives commands from the individual who will use the vehicle which are transmitted from the portable communication unit.

According to the above constitution, the on-board communication unit transmits a response to a portable communication unit which is carried by the user at a separate location, making it possible to assist the user at a separate location. Moreover, commands can be transmitted from the portable communication unit which is carried by the user at a separate location to the on-board communication unit, enabling him to set the status of the vehicle. Therefore, convenience is further increased.

According to a fourth aspect of the invention, the agent apparatus according to one of the first to third aspects comprises a response unit which responds by using an impersonation method.

According to the above constitution, the response unit responds by using an impersonation method, making the vehicle appear more friendly. Incidentally, "impersonation" comprises not only artificial human voices which are artificially produced by the vehicle and the agent apparatus mounted therein, but also artificial voices of animals, imaginary creatures, etc.

The response unit can comprise an image creation unit which creates images of impersonated characters, and a display unit which displays the images created by the image creation unit. Furthermore, the response unit can comprise a voice creation unit which creates voices for the impersonated characters, and a voice output unit which outputs the voices created by the voice creation unit.

DETAILED DESCRIPTION OF THE INVENTION

Figure 1:
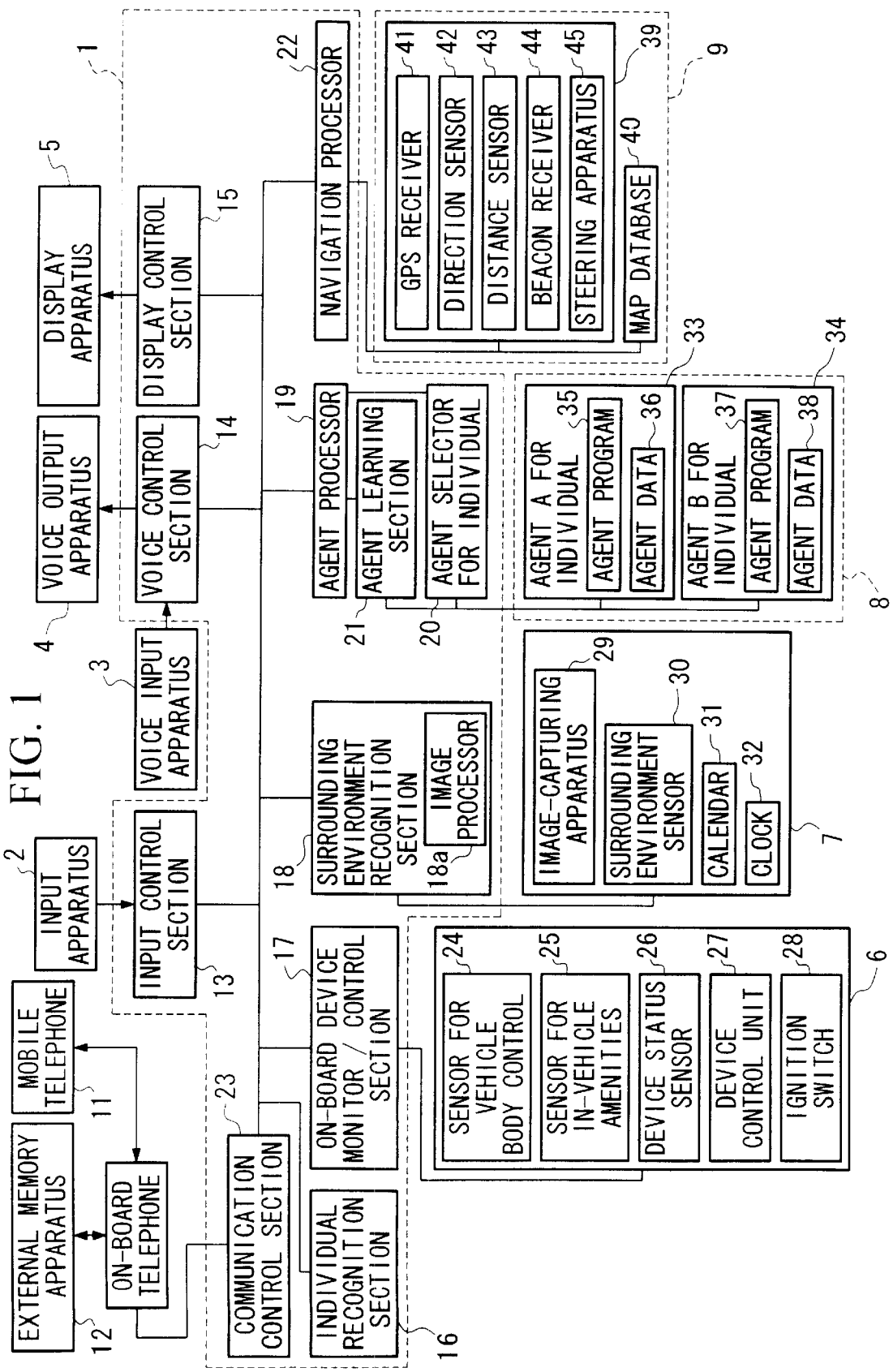
FIG. 1 is a diagram showing the constitution of the agent apparatus in an embodiment of the present invention.
Figure 2A:
FIGS. 2A to 2D show images of characters which are displayed on a display apparatus and represent the agent apparatus and a vehicle as a living creature.
Figure 2B:
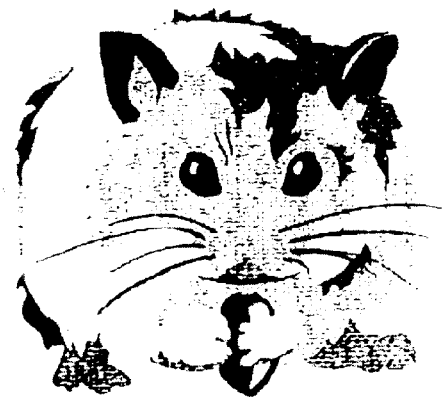
Figure 2C:
Figure 2D:
Figure 3A:
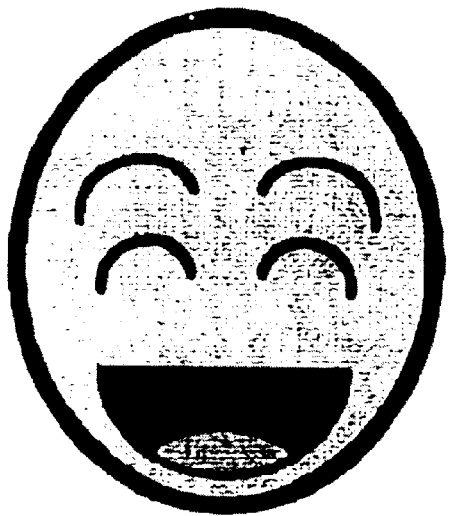
FIGS. 3A to 3D show changes in characters displayed on the display apparatus.
Figure 3B:
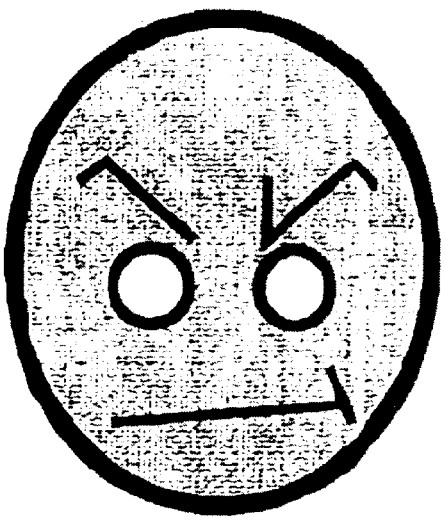
Figure 3C:
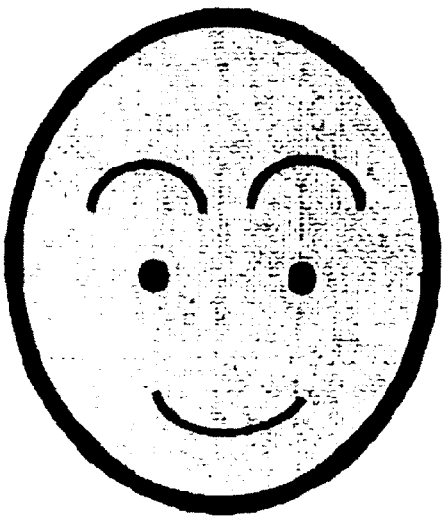
Figure 3D:
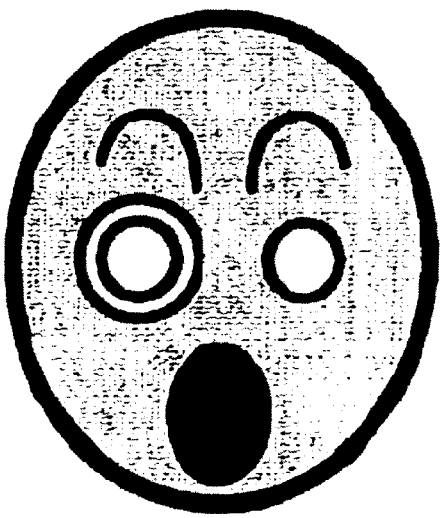
Figure 4A:
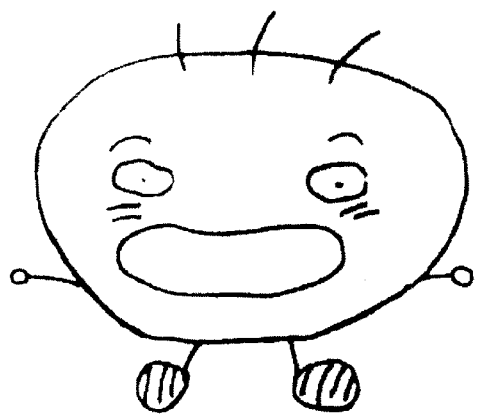
FIGS. 4A to 4D show other examples of characters displayed on the display apparatus.
Figure 4B:
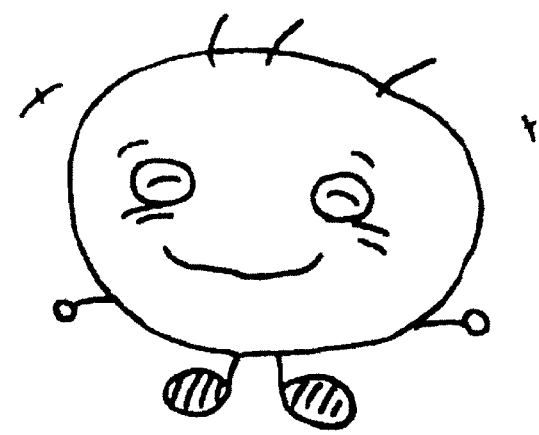
Figure 4C:
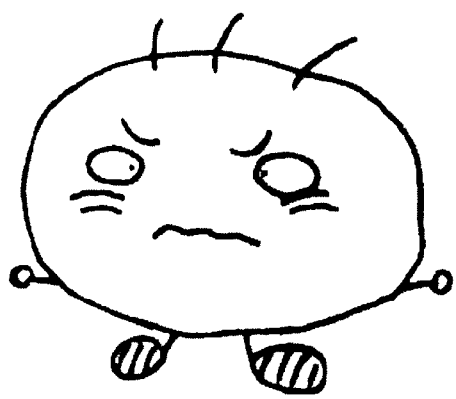
Figure 4D:
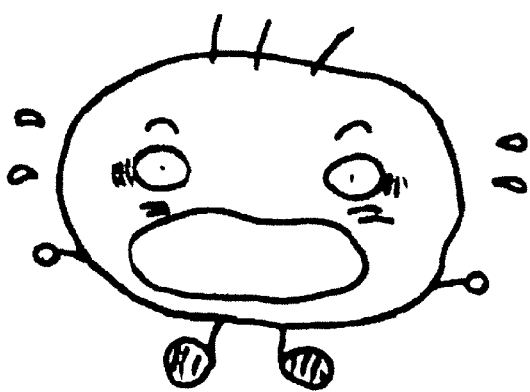

The configuration of the agent apparatus according to an embodiment of this invention will be explained with reference to FIG. 1. Reference code 1 represents a controller comprising a CPU or the like. Reference code 2 represents an input apparatus which inputs departure points and destinations in navigation, the traveling environment of the vehicle, transmission conditions from the agent apparatus, the telephone number of a mobile telephone which communicates with the agent apparatus. and the like. The input apparatus 2 is also used when the user inputs commands and the like to the agent apparatus. Incidentally, the input apparatus specifically comprises a touch panel, a keyboard, a joystick, and the like.

Reference code 3 represents a voice input apparatus, such as a microphone. which inputs the sound of the user's voice. Reference code 4 represents a voice output apparatus, comprising a speaker or the like, which outputs a voice response from the agent apparatus. Reference code 5 represents a display apparatus which displays the response from the agent apparatus as images, text, and the like.

Reference code 6 represents an on-board device monitoring/controlling apparatus which monitors and controls various types of devices mounted in the vehicle. Reference code 7 represents a surrounding environment recognition apparatus which enables the agent apparatus to recognize the environment surrounding the vehicle. Reference code 8 represents a memory apparatus which agent data and the like for individual users are stored in. Reference code 9 represents a navigation system which detects the position and direction of the vehicle.

Reference code 10 represents an on-board telephone for communicating with the outside of the vehicle. The on-board telephone 10 communicates between a portable telephone 11 carried by the user and a memory apparatus (center server) 12 which is provided at a predetermined position outside the vehicle.

Subsequently, the internal constitution of the controller 1 will be explained. The controller 1 comprises an input control section 13, a voice control section 14, a display control section 15, an individual recognition section 16, an on-board device monitor/control section 17, a surrounding environment recognition section 18, an agent processor 19, an agent selector for individual 20, an agent learning section 21, and a navigation processor 22.

The input control section 13 receives a signal from the input apparatus 2. The voice control section 14 inputs a voice signal from the voice input controller 3, and outputs an artificial voice to the voice output apparatus 4. The artificial voice, output from the voice control section 14 to the voice output apparatus 4, is an impersonation of a voice. "Impersonation" comprises not only artificial human voices which are artificially produced by the vehicle and the agent apparatus mounted therein, but also artificial voices of animals, imaginary creatures, etc.

The display control section 15 displays images, text, and the like, on the display apparatus 5. Furthermore, the display control section 15 displays characters personifying the agent apparatus and the vehicle, such as those shown in FIGS. 2A to 2D, on the display apparatus 5. "Personification" comprises not only human characters which personify the vehicle and the agent apparatus mounted therein, but also animals, imaginary creatures, etc, personifying the same. The user can select a character of his choice from, for instance, those in FIGS. 2A to 2D.

FIGS. 3A to 3D show changes in the characters displayed in the display apparatus 5. As shown in FIGS. 3A to 3D, the expressions of the characters change in accordance with conditions. FIGS. 4A to 4D show other examples of characters displayed in the display apparatus 5.

Returning to the explanation of FIG. 1, the individual recognition section 16 recognizes individual users based on information input from the input apparatus 2, the voice input apparatus 3, and the like. For example, the individual recognition section 16 recognizes an individual based on a secret code number, a voice, an image, etc. The on-board device monitor/control section 17 monitors and controls the on-board device monitor/control apparatus 6. The surrounding environment recognition section 18 recognizes the surrounding environment of the vehicle based on information from the surrounding environment recognition apparatus 7. The surrounding environment recognition section 18 contains an image processor 18a which processes image data sent from the surrounding environment recognition apparatus 7.

The agent processor 19 processes agent data for each individual. The agent processor 19 is connected to an agent selector for individual 20, which selects agent data for each individual, and an agent learning section 21, which updates the agent data for each individual. The navigation processor 22 processes information obtained from the navigation system 9. A communication control section 23 controls the on-board telephone 10.

Subsequently, the internal constitution of the on-board device monitor/control apparatus 6 will be explained. The on-board device monitor control apparatus 6 contains a sensor for vehicle body control 24, a sensor for in-vehicle amenities 25, a device status sensor 26, a device control unit 27, and an ignition switch 28.

The sensor for vehicle body control 24 is used when controlling the vehicle body. The sensor for in-vehicle amenities 25 maintains amenities inside the vehicle, and for example comprises a temperature sensor, a humidity sensor, or the like. The device status sensor 26 detects the status of various types of devices mounted in the vehicle. The device control unit 27 controls various types of devices mounted in the vehicle. The ignition switch 28 is used in switching the engine ON and OFF, and the like.

Subsequently, the internal constitution of the surrounding environment recognition apparatus 7 will be explained. The surrounding environment recognition apparatus 7 contains an image-capturing apparatus 29, a surrounding environment sensor 30, a calendar 31, and a clock 32.

The image-capturing apparatus 29 captures an image of the surrounding environment of the vehicle, and specifically comprises a television camera or the like. The surrounding environment sensor 30 detects the surrounding environment of the vehicle. The surrounding environment sensor 30 comprises, for instance, an outer-vehicle temperature sensor or the like. The calendar 31 detects the present year, month, and date. The clock 32 detects the present time.

Subsequently, the internal constitution of the memory apparatus 8 will be explained. In this embodiment, two types of data are stored in the memory apparatus 8. and comprise an agent A for individual (reference code 33), and agent B for individual (reference code 34). However, the number of data in this invention is not limited to two, it being possible to use more than two types of data. The agent A for individual (reference code 33) contains an agent program 35 and agent data 36. The agent B for individual (reference code 34) contains an agent program 37 and agent data 38. The memory apparatus 8 stores individual agent data for each individual user.

Subsequently, the internal constitution of the navigation system 9 will be explained. The navigation system 9 contains a navigation apparatus 39 and a map database 40. The navigation apparatus 39 detects the present position, direction, and the like of the vehicle. The map database 40 stores map information for steering.

The navigation apparatus 39 further contains a GPS receiver 41, a direction sensor 42, a distance sensor 43, a beacon receiver 44, and a steering apparatus 45. The GPS receiver 41 measures the position of the vehicle by using a human-made satellite. The coordinate sensor 42 detects the direction which the vehicle is heading in. The distance sensor 43 detects the distance which the vehicle has traveled. The beacon receiver 44 receives signals from beacons. The steering apparatus 45 detects the angle of steering.

Figure 5:
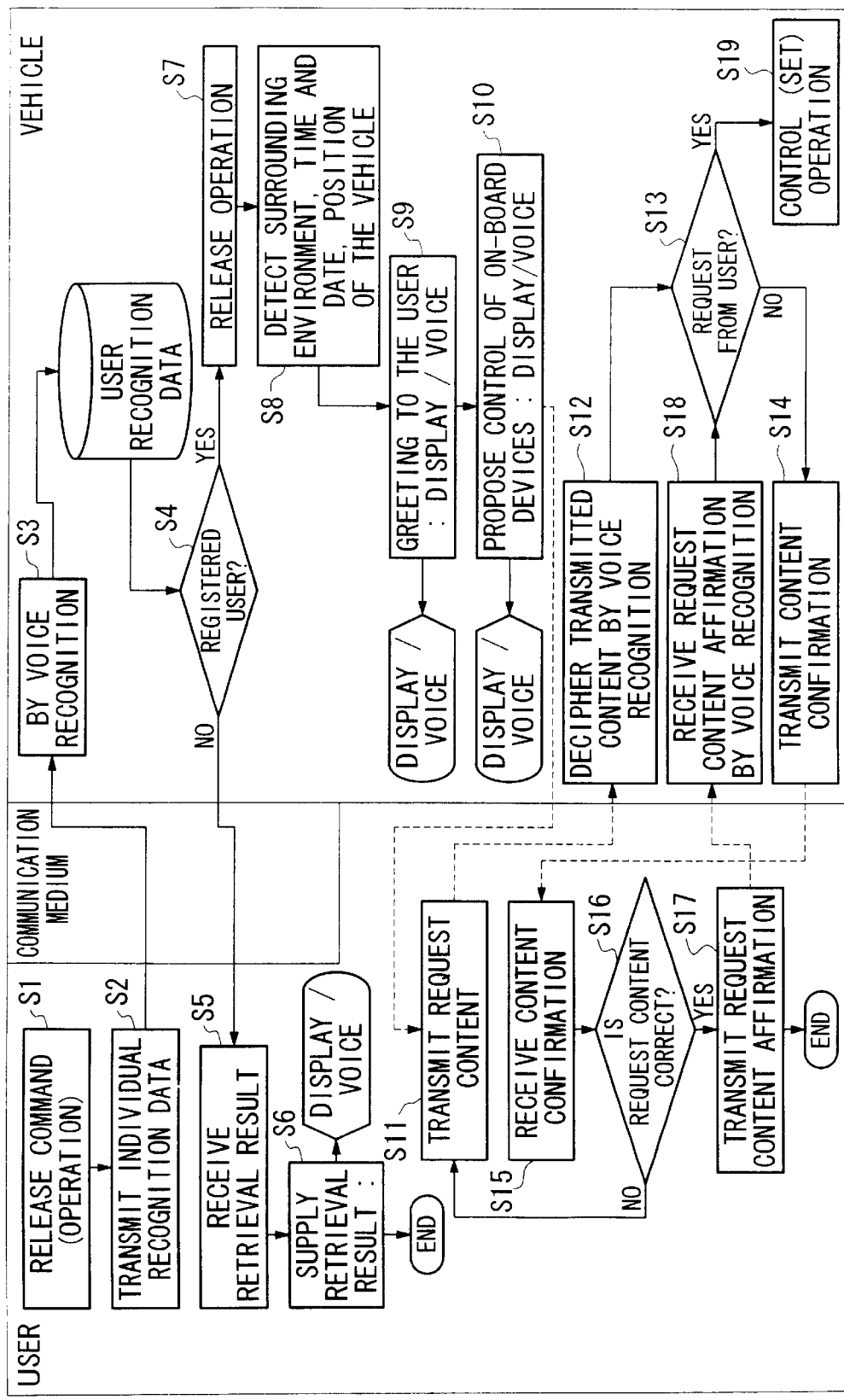
FIG. 5 is a flowchart showing operations of the agent apparatus in the embodiment of the present invention.

Subsequently, the operation of this embodiment will be explained with reference to the flowchart shown in FIG. 5. The reference codes such as S1 in the following description represent steps in the flowchart.

When the user boards the locked and parked vehicle, he makes a release command (S1). More specifically, the release command is made by inputting a secret code number, a voice, an image, and the like, into the agent apparatus. The individual recognition data such as the secret code number, the voice, and the image, is sent to the individual recognition section 16 in the agent apparatus in the vehicle (S2). For example, the user inputs his voice by using the mobile telephone 11 he carries with him. His voice is transmitted via a communication medium to the on-board telephone 10, and then to the individual recognition section 16.

The individual recognition section 16 identifies the user by voice recognition (S3). The user recognition data is retrieved to achieve the recognition. By retrieving the data, it is possible to detect whether the user who generated the voice is the registered user (S4). In the case where it is determined that the user is not the registered user, this result is transmitted to the user via the communication medium (S5) and supplied to the user by a display (image, text, etc.) and by an artificial voice (S6).

When it has been determined in step S4 that the user is the registered user, the device control unit 27 performs a release operation (unlocks the doors) (S7). Then, the surrounding environment recognition apparatus 7 detects the surrounding environment of the vehicle, the time, and the date, and the navigation system 9 detects the position of the vehicle (S8). A greeting to the user is displayed and/or transmitted by voice (S9). Based on the result of the detection made in step S8, it is determined how the various devices in the vehicle should be controlled, and the result of this determination is proposed to the user by display/voice transmission (S10).

Based on this proposal, the user determines the content to be requested from the agent apparatus, and transmits the content he has determined to the agent apparatus by, for example, voice (S11). The agent apparatus deciphers the transmitted content by using a voice recognition function in the voice control section 14 (S12). Based on the deciphered content, it is determined whether the content comprises a request from the user (S13). When the content is not a request, a content confirmation is transmitted to the user by artificial voice (S14). The user receives the content confirmation (S15) and reconsiders whether the request content was correct (S16). When it was incorrect, he returns to step S11 and retransmits the request content. When the request content was correct, the user transmits a request content affirmation (S17). The transmitted request content affirmation is received by the voice recognition function of the agent apparatus (S18). The agent apparatus proceeds to the processing of step S13. In step S13, in the case when the content deciphered by the voice recognition function was a request, controls and settings are carried out in accordance with the request (S19).

Figure 6:
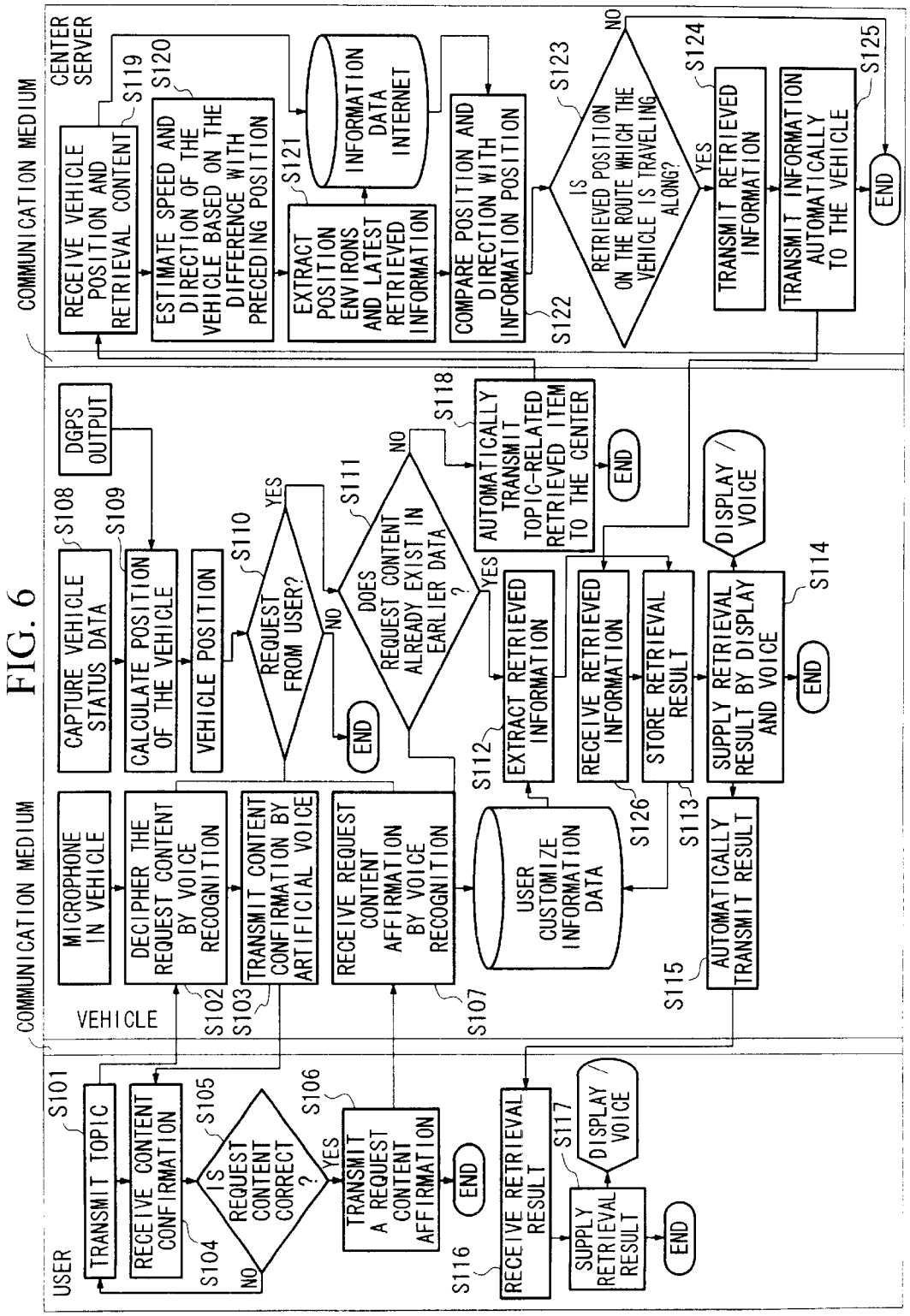
FIG. 6 is a flowchart showing an operation when the agent apparatus becomes the speaking partner for the user.

Subsequently, an operation executed by the agent apparatus when acting as a speaking partner for the user will be explained with reference to the flowchart shown in FIG. 6. The reference codes such as S101 in the following description represent steps in the flowchart.

When the user transmits (speaks) some kind of topic (S101), the agent apparatus mounted in the vehicle inputs the voice of the user from the voice input apparatus 3. The voice control section 14 identifies the voice, and deciphers the content transmitted by the user (S102). The voice control section 14 sends a content confirmation to the user by using an artificial voice (S103). That is, the voice control section 14 transmits an artificial voice to the voice output apparatus 4, and the voice output apparatus 4 generates an artificial voice. The user receives the content confirmation by listening to the artificial voice (S104). The user confirms whether or not the request content is correct (S105). When it is incorrect, processing returns to step S101. When it is correct, the user transmits a request content affirmation by voice (S106) to the agent apparatus. The agent apparatus receives the request content affirmation by using the voice recognition function as described above (S107).

The agent apparatus mounted in the vehicle regularly captures vehicle status data (S108). In addition, the agent apparatus receives the output from the navigation system 9, which comprises a DGPS and the like, calculates the position of the vehicle (S109), and thereby determines the position of the vehicle.

When any type of content is transmitted from the user in this state, it is determined whether the content is a request from the user (S110). When the content transmitted by the user is not a request, processing ends here. When the content transmitted by the user is a request, it is determined whether the request content already exists in earlier data (the memory apparatus 8) (S111).

When the request content already exists in earlier data, the earlier data stored in the memory apparatus is retrieved and the required information is extracted (S112). The retrieval result is stored (S113). The retrieval result is supplied to the user by display and voice (the display apparatus 5 and the voice output apparatus 4) (S114). The retrieval result is automatically transmitted to the user (S115). The user receives the transmitted retrieval result (S116). The retrieval result is supplied to the user by display and voice (S117).

When it is determined in step S111 that the request content does not already exist in the earlier data, a topic-related retrieved item is automatically transmitted to the center (the external memory apparatus 12) (S118). That is, the topic-related retrieved item is transmitted from the communication control section 23 to the on-board telephone 10, and from the on-board telephone 10 via a communication medium to the center server (external memory apparatus 12).

The center server (external memory apparatus 12) receives the topic-related retrieved item i.e. the vehicle position and the retrieval content (S119), and estimates the speed and direction of the vehicle based on the difference between this vehicle position and the preceding position (S120). The position environs and the latest retrieved information are extracted (S121). The position and direction of the vehicle are compared with the information position (S122).

Subsequently, it is determined whether the retrieved position is on the route which the vehicle is traveling along (S123). When the retrieved position is on the route which the vehicle is traveling along, the retrieved information is transmitted (S124). That is, the information is transmitted automatically to the vehicle (S125). When the information is transmitted from the center server (external memory apparatus 12) via the communication medium to the vehicle, the agent apparatus in the vehicle receives the retrieved information (S126) and processing proceeds to step S113.

Figure 7:
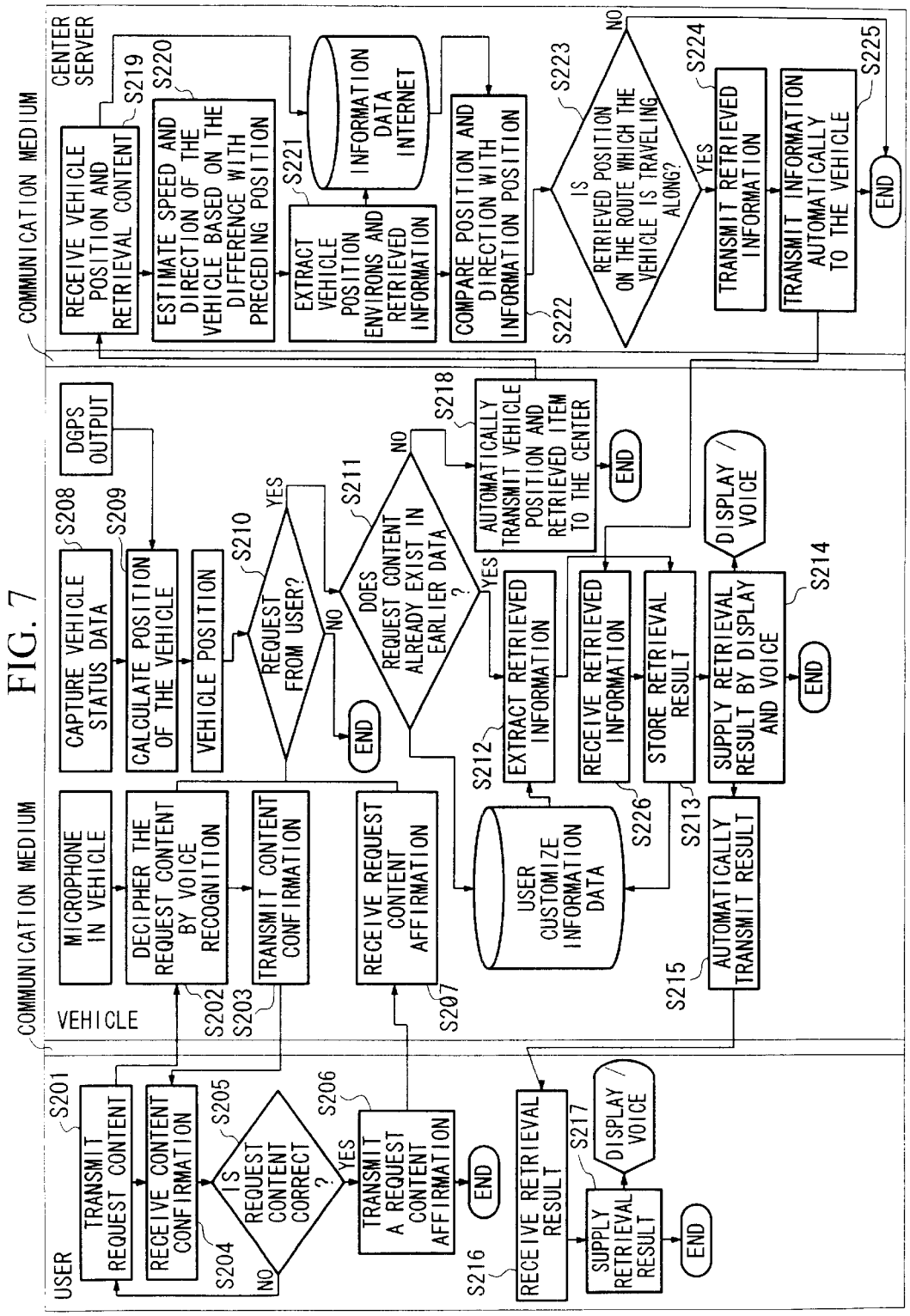
FIG. 7 is a flowchart showing an operation when the agent apparatus searches for contents desired by the user.

Subsequently, the operation of the agent apparatus when retrieving a content desired by the user will be explained with reference to the flowchart shown in FIG. 7. The reference codes such as S201 in the following description represent steps in the flowchart.

When the user transmits (speaks) some kind of request (S201), the agent apparatus mounted in the vehicle inputs the voice of the user from the voice input apparatus 3. The voice control section 14 identifies the voice, and deciphers the content transmitted by the user (S202). The voice control section 14 sends a content confirmation to the user by using an artificial voice (S203). That is, the voice control section 14 transmits an artificial voice to the voice output apparatus 4, and the voice output apparatus 4 generates an artificial voice. The user receives the content confirmation by listening to the artificial voice (S204). Then, the user confirms whether or not the request content is correct (S205). When it is incorrect, the processing returns to step S201. When it is correct, the user transmits a request content affirmation by voice (S206) to the agent apparatus. The agent apparatus receives the request content affirmation by using the voice recognition function as described above (S207).

The agent apparatus mounted in the vehicle regularly captures vehicle status data (S208). In addition, the agent apparatus receives the output from the navigation system 9, which comprises a DGPS and the like, calculates the position of the vehicle (S209), and thereby determines the position of the vehicle.

When any type of request is transmitted from the user in this state, it is determined whether the content is a request from the user (S210). When the content transmitted by the user is not a request, processing ends here. When the content transmitted by the user is a request, it is determined whether the request content already exists in earlier data (the memory apparatus 8) (S211).

When the request content already exists in earlier data, the earlier data stored in the memory apparatus 8 is retrieved and the required information is extracted (S212). The retrieval result is stored (S213). The retrieval result is supplied to the user by display and voice (the display apparatus 5 and the voice output apparatus 4) (S214). The retrieval result is automatically transmitted to the user (S215). The user receives the transmitted retrieval result (S216), which is supplied to him by display and voice (S217).

When it is determined in step S211 that the request content does not already exist in the earlier data, a topic-related retrieved item is automatically transmitted to the center (the external memory apparatus 12) (S218). That is, the topic-related retrieved item is transmitted from the communication control section 23 to the on-board telephone 10, and from the on-board telephone 10 via a communication medium to the center server (external memory apparatus 12).

The center server (external memory apparatus 12) receives the vehicle position and the retrieval content (S219), and estimates the speed and direction of the vehicle based on the difference between this vehicle position and the preceding position (S220). The position environs and the latest retrieved information are extracted (S221). The position and direction of the vehicle are compared with the information position (S222).

Subsequently, it is determined whether the retrieved position is on the route which the vehicle is traveling along (S223). When the retrieved position is on the route which the vehicle is traveling along, the retrieved information is transmitted (S224). That is, the information is transmitted automatically to the vehicle (S225). When the information is transmitted from the center server (external memory apparatus 12) via the communication medium to the vehicle, the agent apparatus in the vehicle receives the retrieved information (S226) and processing proceeds to step S213.

Subsequently, the operation of this embodiment with be explained with emphasis on the phenomena experienced by the user. The user is individually identified at the moment he attempts to board the vehicle by his fingerprints, his vocal characteristics, his image, and the like. When it has been confirmed by individual recognition that the user is the registered user, the doors are unlocked and the user is allowed to board the vehicle.

The agent apparatus in the vehicle speaks to the user as he boards the vehicle. That is, the voice output apparatus 4 generates an artificial voice. For instance, when the user boards the vehicle in the morning, the clock 32 in the agent apparatus detects the time, and a greeting such as "Good Morning Mr. X" is announced to the user, in accordance with the detection result and the individual recognition result, by the artificial voice. This greeting spoken by the artificial voice varies depending on the time, weather, season, outside temperature, etc.

Alternatively, the user can give the agent apparatus a name, and when the user calls the agent apparatus by its name, a greeting such as the above is offered in response. The name given to the agent apparatus is stored in the agent data for individual in the memory apparatus 8.

The user can set a character corresponding to the agent apparatus and the vehicle as he desires. The set character is displayed on the display apparatus 5 mounted in the vehicle. The character can be selected from, for example, a friend, an animated character, a secretary, a female assistant, a dog, a cat, a bird, a scary dragon, etc.

When a predetermined time has elapsed following the greeting, the agent apparatus asks the user "Would you like to start the engine?". When the user replies that he wants to starts the engine, the agent apparatus starts the engine by using the ignition switch 28.

The agent apparatus asks the user further questions such as "What kind of music would you like?", "In this area, you can receive FM channels A and B. Last time you listened to A. Would you like the same channel again?", "The program C is being broadcast now.", and "You have CDs AA and BB. Which would you like to hear?". The navigation system 9 is used in detecting the area, and the clock 32 is used in detecting the time. The channel which the user previously listened to is stored in the agent data for individual in the memory apparatus 8.

When the user sets the route by using the navigation system 9, an individual selection reference (whether to use the highway and toll roads, whether to take the shortest route, etc) is extracted from the agent data for individual, and the route is set based on this information. Furthermore, the beacon receiver 44 adds traffic information obtained in real time, and the route is set to the shortest one while giving priority to routes which satisfy the preferences of the user. The agent apparatus responds with phrases such as, for example, "The route to point A has been set. You have indicated a wish to use the toll road, but this road is currently out of use, and so a route has been set which does not use the toll road.", "Do you want to display the set route on the NAVI screen?", and "If you are satisfied with the set route, route guidance will commence."

The agent apparatus detects the amenities inside the vehicle, and responds with phrases such as "The air conditioner is now on, but will take 10 minutes to attain the set temperature. The set temperature could be attained in 5 minutes by opening the window. Shall I open the window?", and "The exhaust from the vehicle in front is rather smelly. I shall switch to internal air feedback." The sensor for in-vehicle amenities 25. the surrounding environment sensor 30, and the like, are used in this process.

When the user is a long distance from the vehicle, he can use his mobile telephone 11 to call the agent apparatus in the vehicle and thereby transmit commands thereto. For example, the user can instruct the agent apparatus to complete the settings of his choice before he boards the vehicle. The user can collect information relating to traffic conditions and the route to the destination, book accommodation, and the like, before he boards the vehicle.

A display unit may be provided in the mobile telephone 11 carried by the user, making it possible to transmit image data of the character preferred and preset by the user to his mobile telephone 11 when a call is received from him, the character being displayed on the display unit of the mobile telephone 11. According to this constitution. the user can make various settings relating to the vehicle by having an impersonated conversation with the character while viewing the character on the display unit of the mobile telephone 11.

According to this invention, an individual recognition unit recognizes individuals, thereby improving security. The individual recognition unit recognizes the individuals, a selection unit selects agent data corresponding to each individual from agent data stored in a memory unit, and a response unit sends an appropriate response to each individual. Therefore, convenience is increased.

Further, according to this invention, a learning unit changes the content of agent data stored in the memory unit in accordance with commands input from an input unit. Therefore, the agent apparatus learns the preferences and the like of the individuals who use the vehicle, and functions better the more it is used by each individual. This further increases convenience.

Further, according to this invention, an on-board communication unit transmits a response to a portable communication unit which is carried by the user at a separate location, making it possible to assist the user at the separate location. Moreover, commands can be transmitted from the portable communication unit which is carried by the user at the separate location to the on-board communication unit, enabling the user to set the status of the vehicle. Therefore, convenience is further increased.

For example, the user can send a command from the portable communication unit (e.g. a mobile telephone) and complete the settings of the vehicle status before he boards the vehicle. For example, the user can adjust traffic information, distance, entertainment information, and the like, to his destination.

Further, according to this invention, a response unit responds by using an impersonation method, making the vehicle appear more friendly.

This invention may be embodied in other forms or carried out in other ways without departing from the spirit thereof The present embodiments are therefore to be considered in all respects illustrative and not limiting, the scope of the invention being indicated by the appended claims, and all modifications falling within the meaning and range of equivalency are intended to be embraced therein.

What is claimed is:

1. An agent apparatus comprising:
    an individual recognition unit which recognizes individuals who use a vehicle;
    a memory unit which stores agent data corresponding to each individual rcognized by said individual recognition unit;
    a selection unit which selects agent data corresponding to a specific individual recognized by said individual recognition unit from the agent data stored in said memory unit;
    a response unit which responds to the individual based on the agent data selected by said selection unit;
    an input unit which inputs commands from the individuals who use the vehicle;
    a command execution unit which executes commands input from said input unit; and
    a learning unit which changes the content of the agent data stored in said memory unit in accordance with commands input from said input unit in a manner such that the agent apparatus learns the preferences of the individuals who use the vehicle.

2. The agent apparatus as described in claim 1, wherein said response unit responds by using an impersonation method.

3. The agent apparatus as described in claim 1, further comprising:
    a voice input unit for inputting voice of the individual, wherein the individual recognition unit identifies the individual by voice recognition.

4. The agent apparatus as described in claim 3, further comprising:
    a voice output unit for outputting an artificial voice in response to the input of the voice of the individual.

5. The agent apparatus as described in claim 3, further comprising:
    a display unit for outputting an image in response to the input of the voice of the individual.

6. The agent apparatus as described in claim 3, wherein the memory unit extracts data corresponding to a request by the voice of the individual, and
    the response unit responds to the individual based on the data corresponding to the request.

7. The agent apparatus as described in claim 1, further comprising:
    a navigation system which provides information using the response unit based on the agent data selected by the selection unit.

8. The agent apparatus as described in claim 1, further comprising:
    a sensor for in-vehicle amenities which provides information using the response unit based on the agent data selected by the selection unit.

9. An agent apparatus comprising:
    an individual recognition unit which recognizes individuals who use a vehicle;
    a memory unit which stores agent data corresponding to each individual recognized by said individual recognition unit;
    a selection unit which selects agent data a corresponding to a specific individual recognized by said individual recognition unit from the agent data stored in said memory unit;

a response unit which responds to the individual based on the agent data selected by said selection unit; and an on-board communication unit which transmits a response from said response unit to a portable communication unit carried by an individual who will use the vehicle, and receives commands from the individual who will use the vehicle which are transmitted from said portable communication unit.

* * * * *